(12) United States Patent
Nishida et al.

(10) Patent No.: US 8,885,608 B2
(45) Date of Patent: Nov. 11, 2014

(54) MOBILE COMMUNICATION METHOD (75) Inventors: Katsutoshi Nishida, Tokyo (JP);
Keisuke Suzuki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/703,378

(22) PCT Filed: Jun. 13, 2011

(86) PCT No.: PCT/JP2011/063449
§ 371 (c)(1),
(2), (4) Date: Feb. 25, 2013

(87) PCT Pub. No.: WO2011/158771
PCT Pub. Date: Dec. 22, 2011

(65) Prior Publication Data
US 2013/0148594 A1    Jun. 13, 2013

(30) Foreign Application Priority Data
Jun. 16, 2010 (JP) ................................. P2010-137780

(51) Int. Cl.
*H04W 4/00* (2009.01)
*H04W 76/02* (2009.01)
*H04L 29/06* (2006.01)
*H04W 76/06* (2009.01)

(52) U.S. Cl.
CPC ............ *H04W 76/02* (2013.01); *H04W 76/028* (2013.01); *H04W 76/06* (2013.01); *H04L 65/1016* (2013.01)
USPC ............................ 370/331; 370/401; 370/436

(58) Field of Classification Search
None
See application file for complete search history.

(56) References Cited

U.S. PATENT DOCUMENTS

| | | | | |
|---|---|---|---|---|
| 7,702,775 | B2 * | 4/2010 | Kuan et al. | 709/224 |
| 7,743,094 | B2 * | 6/2010 | Metke et al. | 709/203 |
| 7,768,994 | B2 * | 8/2010 | Tuomainen et al. | 370/351 |
| 8,335,832 | B2 * | 12/2012 | Lu et al. | 709/206 |
| 2008/0259873 | A1 * | 10/2008 | Ahmavaara et al. | 370/331 |
| 2009/0124259 | A1 * | 5/2009 | Attar et al. | 455/436 |
| 2009/0199268 | A1 * | 8/2009 | Ahmavaara et al. | 726/1 |
| 2009/0207807 | A1 * | 8/2009 | Mahdi et al. | 370/331 |
| 2009/0239526 | A1 * | 9/2009 | Zhao et al. | 455/424 |

(Continued)

FOREIGN PATENT DOCUMENTS

| | | | | |
|---|---|---|---|---|
| CN | 101568100 | A | 10/2009 | |
| EP | 2112851 | A2 * | 10/2009 | H04W 60/00 |
| JP | 2009-267706 | A | 11/2009 | |

OTHER PUBLICATIONS

International Search Report issued in PCT/JP2011/063449 mailed Jul. 5, 2011 (2 pages).

(Continued)

*Primary Examiner* — Bunjob Jaroenchonwanit
(74) *Attorney, Agent, or Firm* — Osha Liang LLP (57) ABSTRACT

A mobile communication method according to the present invention includes the steps of : causing an MME#1 after restart not only to transmit "Paging" to a UE but also to transmit "Delete Session Request" containing IMSI of the UE and "Cause=MME restart" to an S-GW#1, when receiving "Downlink Data Notification" containing the IMSI of the UE from the S-GW#1; causing the S-GW#1 not only to release a bearer for the UE but also to transmit the "Delete Session Request" containing the "Cause=MME restart" to the P-GW#1, upon receipt of the "Delete Session Request"; and causing the P-GW#1 to release the bearer for the UE.

2 Claims, 5 Drawing Sheets

(56) References Cited

U.S. PATENT DOCUMENTS

| | | | |
|---|---|---|---|
| 2009/0270111 A1 | 10/2009 | Nakamura et al. | |
| 2010/0202351 A1* | 8/2010 | Xi et al. | 370/328 |
| 2010/0260141 A1* | 10/2010 | Chowdhury et al. | 370/331 |
| 2010/0267388 A1* | 10/2010 | Olsson | 455/436 |
| 2010/0323700 A1* | 12/2010 | Bachmann et al. | 455/436 |
| 2011/0134774 A1* | 6/2011 | Pelletier et al. | 370/252 |
| 2011/0142239 A1* | 6/2011 | Suh et al. | 380/270 |
| 2011/0170499 A1* | 7/2011 | Nayeb Nazar et al. | 370/329 |
| 2011/0170517 A1* | 7/2011 | Bakker et al. | 370/331 |
| 2011/0185049 A1* | 7/2011 | Atreya et al. | 709/222 |
| 2011/0199969 A1* | 8/2011 | Yang | 370/328 |
| 2011/0205937 A1* | 8/2011 | Patel et al. | 370/259 |
| 2011/0235569 A1* | 9/2011 | Huang et al. | 370/315 |
| 2011/0286465 A1* | 11/2011 | Koodli et al. | 370/401 |
| 2012/0033659 A1* | 2/2012 | Zhang et al. | 370/338 |
| 2012/0039213 A1* | 2/2012 | Cheng et al. | 370/254 |
| 2012/0039303 A1* | 2/2012 | Stenfelt et al. | 370/331 |
| 2012/0057532 A1* | 3/2012 | Qi et al. | 370/328 |
| 2012/0093086 A1* | 4/2012 | Yin et al. | 370/328 |
| 2012/0164979 A1* | 6/2012 | Bachmann et al. | 455/411 |
| 2013/0053032 A1* | 2/2013 | Guo | 455/435.1 |
| 2013/0053041 A1* | 2/2013 | Li et al. | 455/437 |
| 2013/0058223 A1* | 3/2013 | Yin et al. | 370/242 |
| 2013/0064158 A1* | 3/2013 | Sundell et al. | 370/311 |
| 2013/0088956 A1* | 4/2013 | Zhou et al. | 370/230 |

OTHER PUBLICATIONS

NEC; "EPC node failure"; 3GPP TSG CT4 Meeting #49, C4-101116, Kyoto, Japan; May 10-14, 2010 (8 pages).

3GPP TS 23.007 V9.3.0; "3rd Generation Partnership Project; Technical Specification Group Core Network and Terminals; Restoration procedures (Release 9)"; Mar. 2010; pp. 23-25 (4 pages).

Japanese Office Action in corresponding Japanese Application No. 2010-137780 mailed on Jul. 5, 2011 (6 pages).

Office Action issued in corresponding Chinese Application No. 201180028952.9, mailed Jul. 29, 2013 (13 pages).

Official Action in the counterpart Australian Patent application No. 2011266176 issued on Nov. 13, 2013 (3 pages).

Extended Search Report in the counterpart European Patent application No. 11795677.1 issued on Nov. 19, 2013 (8 pages).

3GPP TS 23.401 V9.5.0; "General Packet Radio Service (GPRS) enhancements for Evolved Universal Terrestial Radio Access Network (E-UTRAN) access"; Jun. 10, 2010 (37 pages).

Office Action issued in counterpart Chinese Patent Application No. 201180028952.9 dated Mar. 5, 2014 (15 pages).

Office Action issued in counterpart Australian Patent Application No. 2011266176 dated Mar. 12, 2014 (3 pages).

Office Action in corresponding Canadian Patent Application No. 2,802,030 dated Jul. 23, 2014 (3 pages).

* cited by examiner

MOBILE COMMUNICATION METHOD

TECHNICAL FIELD

The present invention relates to a mobile communication method.

BACKGROUND ART

Non-Patent Document 1 proposes operations when there is an incoming call addressed to a UE (a User Equipment) in Idle state in which registration with an IMS (an IP Multimedia Subsystem) is complete after restart of an MME (a Mobility Management Entity) which once stops due to a failure and the like.

PRIOR ART DOCUMENT

Non-Patent Document

Non-Patent Document 1: 3GPP TSG CT4 Meeting #49, C4-101116

SUMMARY OF THE INVENTION

Problems to be Solved by the Invention

However, the applicant has discovered that the following problems occur in such operations.

In the following, the problems of the operations as described in Non-Patent Document 1 will be described with reference to FIG. 5.

Figure 5:
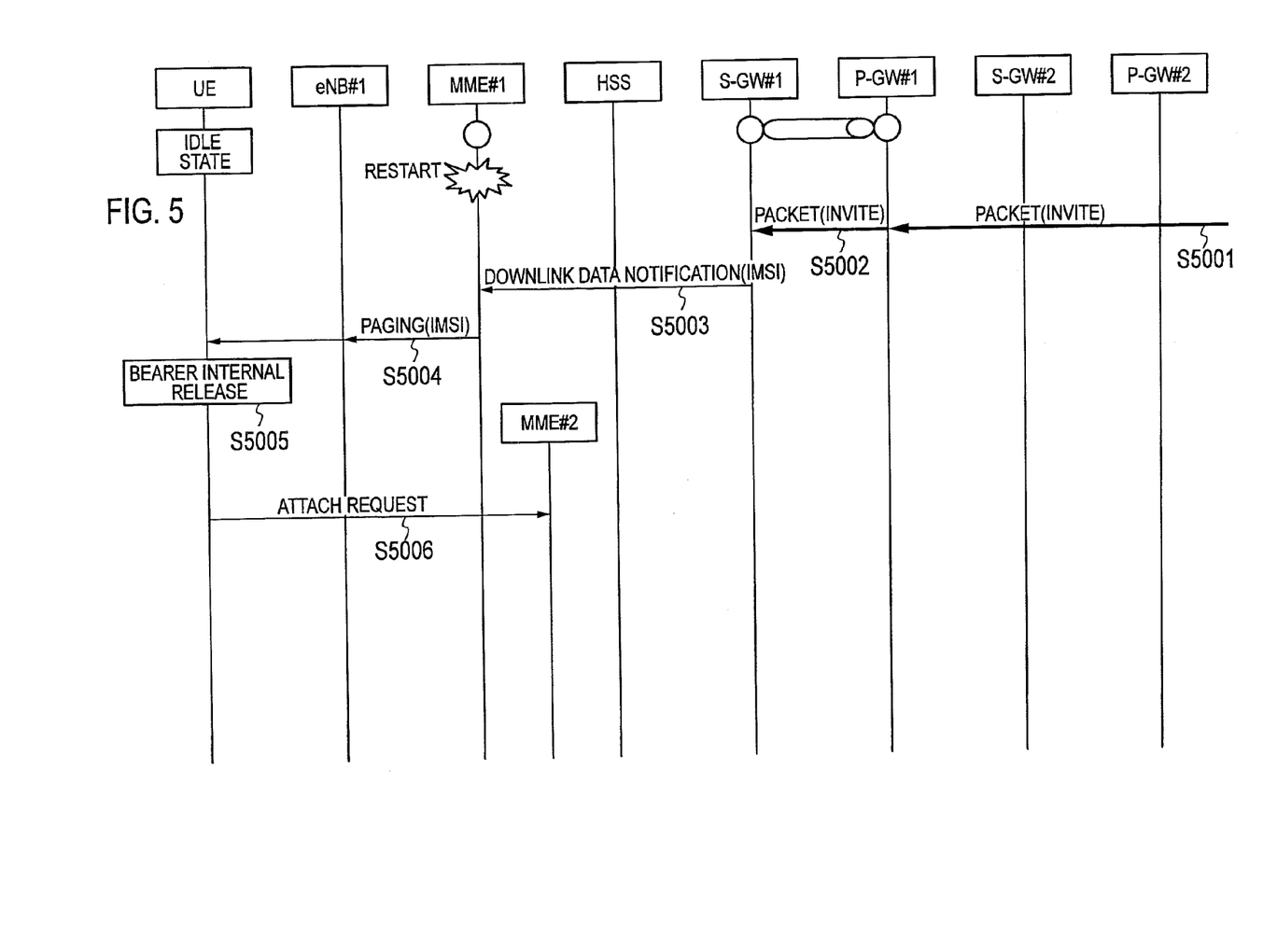
FIG. 5 is a sequence diagram describing operations of a conventional mobile communication system.

As shown in FIG. 5, if there is an incoming call addressed to a UE in Idle state in which registration with an IMS is complete after restart of an MME which once stops due to a failure and the like while a bearer for the UE is established between an S-GW (Serving Gateway) #1 and a P-GW (Packet Data Network Gateway) #1, the P-GW#1 receives a packet addressed to the UE in Step S5001 and transmits such a packet to the S-GW#1 in Step S5002. It is assumed that such a packet contains "INVITE" addressed to the UE.

In Step S5003, the S-GW#1 transmits "Downlink Data Notification" containing IMSI (International Mobile Subscriber Identity) of the UE to an MME#1.

In Step S5004, the MME#1 transmits "Paging" to the UE.

In Step S5005, when receiving such "Paging", the UE releases the above-mentioned bearer for the UE.

In Step S5006, the UE transmits "Attach Request" to the MME#1.

However, in the above-mentioned Non-Patent Document 1, there is a problem that it does not specify how to operate if the UE transmits "Attach Request" to an MME#2 and not to the MME#1.

In addition, there is another problem that if a termination process addressed to the UE is performed via the MME#2 in such a situation, the bearer for the UE is not deleted and remains between the S-GW#1 and the P-GW#1, which thus wastes a resource.

Hence, the present invention has been made in view of the problems described above, and an objective of the present invention is to provide a mobile communication method for enabling a termination process to a UE to be performed without wasting a resource, if there is an incoming call addressed to such a UE in Idle state in which registration with an IMS is complete, after restart of an MME which once stops due to a failure and the like.

Means for Solving the Problem

A first characteristic of the present invention is a mobile communication method, and is summarized in that the method includes the steps of: causing a first mobility management node to restart while a bearer for a mobile station is established between a first serving gateway device and a first packet data network gateway device; causing the first mobility management node not only to transmit a paging signal to the mobile station but also to transmit to the first serving gateway device a delete session request signal containing identification information of the mobile station and information indicating that the first mobility management node has restarted, when receiving a notification signal containing the identification information of the mobile station from the first serving gateway device; causing the first serving gateway device not only to release the bearer for the mobile station, but also to transmit to the first packet data network gateway device the delete session request signal containing the information indicating that the first mobility management node has restarted, upon receipt of the delete session request signal; causing the first packet data network gateway device to release the bearer for the mobile station, upon receipt of the delete session request signal; causing the mobile station to transmit an attach request signal to a second mobility management node, upon receipt of the paging signal; and in response to the attach request signal, establishing a bearer for a mobile station between a second serving gateway device and a second packet data network gateway device.

A second characteristic of the present invention is a mobile communication method, and is summarized in that the method includes the steps of: causing a first mobility management node to restart while a bearer for a mobile station is established between a first serving gateway device and a first packet data network gateway device; causing the first mobility management node to transmit a paging signal to the mobile station, when receiving a notification signal containing identification information of the mobile station from the first serving gateway device; causing the mobile station to transmit an attach request signal to a second mobility management node, upon receipt of the paging signal; causing the second mobility management node to transmit a create session request signal to the first serving gateway device, upon receipt of the attach request signal; causing the first serving gateway device not only to release the bearer for the mobile station, but also to transmit the create session request signal to the first packet data network gateway device, upon receipt of the create session request signal; causing the first packet data network gateway device to release the bearer for the mobile station, upon receipt of the create session request signal; and resetting the bearer for the mobile station between the first serving gateway device and the first packet data network gateway device.

A third characteristic of the present invention is a mobile communication method, and is summarized in that the method includes the steps of: causing a first mobility management node to restart while a bearer for a mobile station is established between a first serving gateway device and a first packet data network gateway device; causing the first mobility management node to transmit a paging signal to the mobile station, when receiving a notification signal containing identification information of the mobile station from the first serving gateway device; causing the mobile station to transmit an attach request signal to a second mobility management node, upon receipt of the paging signal; causing the second mobility management node to transmit a create session request signal to the first serving gateway device, upon receipt of the attach request signal; causing the first serving gateway device to transmit a modify bearer request signal to the first packet data network gateway device, without releasing the bearer for the mobile station, upon receipt of the create session request signal; and resetting the bearer for the mobile station between the first serving gateway device and the first packet data network gateway device.

A fourth characteristic of the present invention is a mobile communication method, and is summarized in that the method includes the steps of: causing a first mobility management node to restart while a bearer for a mobile station is established between a first serving gateway device and a first packet data network gateway device; causing the first mobility management node to transmit a paging signal to the mobile station, when receiving a notification signal containing identification information of the mobile station from the first serving gateway device; causing the mobile station to transmit an attach request signal to the first mobility management node, upon receipt of the paging signal; causing the first mobility management node to transmit a create session request signal to the first serving gateway device, upon receipt of the attach request signal; causing the first serving gateway device not only to release the bearer for the mobile station but also to transmit the create session request signal to the first packet data network gateway device, upon receipt of the create session request signal; causing the first packet data network gateway device to release the bearer for the mobile station, upon receipt of the create session request signal; and resetting the bearer for the mobile station between the first serving gateway device and the first packet data network gateway device.

A fifth characteristic of the present invention is a mobile communication method, and is summarized in that it includes the steps of: causing a first mobility management node to restart while a bearer for a mobile station is established between a first serving gateway device and a first packet data network gateway device; causing the first mobility management node to transmit a paging signal to the mobile station, when receiving a notification signal containing identification information of the mobile station from the first serving gateway device; causing the mobile station to transmit an attach request signal to the first mobility management node, upon receipt of the paging signal; causing the first mobility management node to transmit a create session request signal to the first serving gateway device, upon receipt of the attach request signal; causing the first serving gateway device to transmit a modify bearer request signal to the first packet data network gateway device, without releasing the bearer for the mobile station, upon receipt of the create session request signal; and resetting the bearer for the mobile station between the first serving gateway device and the first packet data network gateway device.

Effect of the Invention

As described above, according to the present invention, a mobile communication method can be provided which enables a termination process addressed to a UE to be performed without wasting a resource, when there is an incoming call addressed to such a UE in Idle state in which registration with an IMS is complete, after restart of an MME which once stops due to a failure and the like.

MODES FOR CARRYING OUT THE INVENTION

Mobile Communication System According to a First Embodiment of the Present Invention A mobile communication system according to a first embodiment of the present invention will be described with reference to FIG. 1 and FIG. 2.

Figure 1:
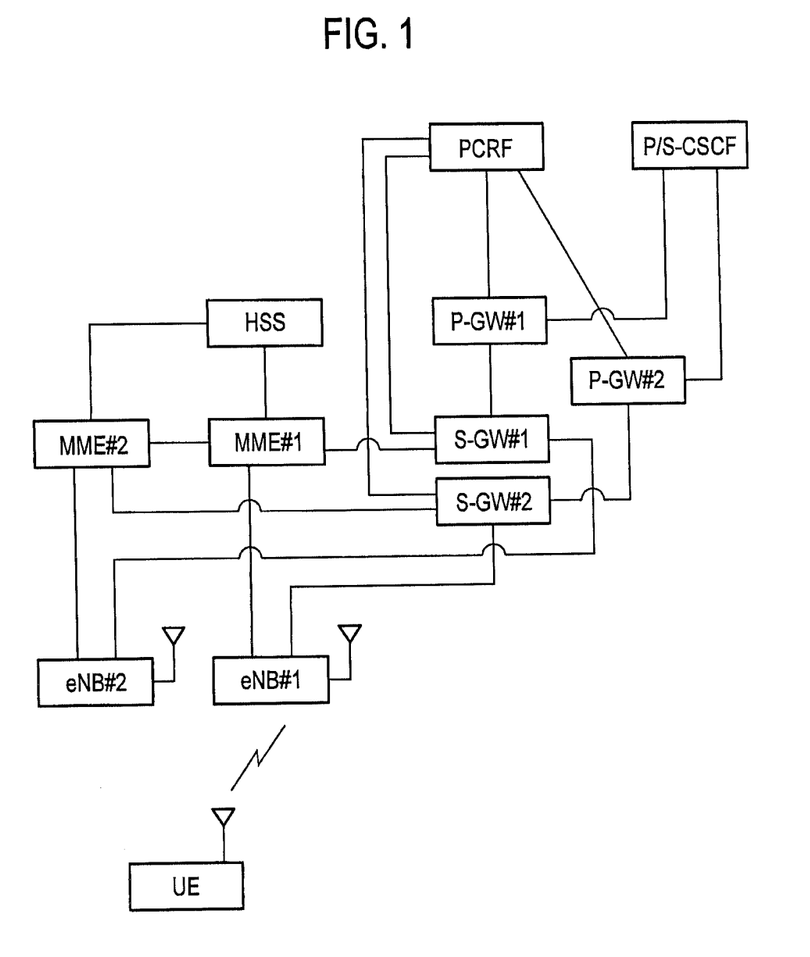
FIG. 1 is an overall configurational view of a mobile communication system according to a first embodiment of the present invention.

As shown in FIG. 1, the mobile communication system according to the embodiment includes a P/S-CSCF (Proxy/Serving-Call Session Control Function), PCRF (Policy and Charger Rule Function), P-GW#1, P-GW#2, S-GW#1, S-GW#2, MME#1, MME#2, eNB#1, eNB#2, and HSS (Home Subscriber Server).

In the following, with reference to FIG. 2, operations when there is an incoming call addressed to a UE in Idle state in which registration with an IMS is complete after restart of an MME#1 which once stops due to a failure and the like, in the mobile communication system according to the embodiment will be described.

Figure 2:
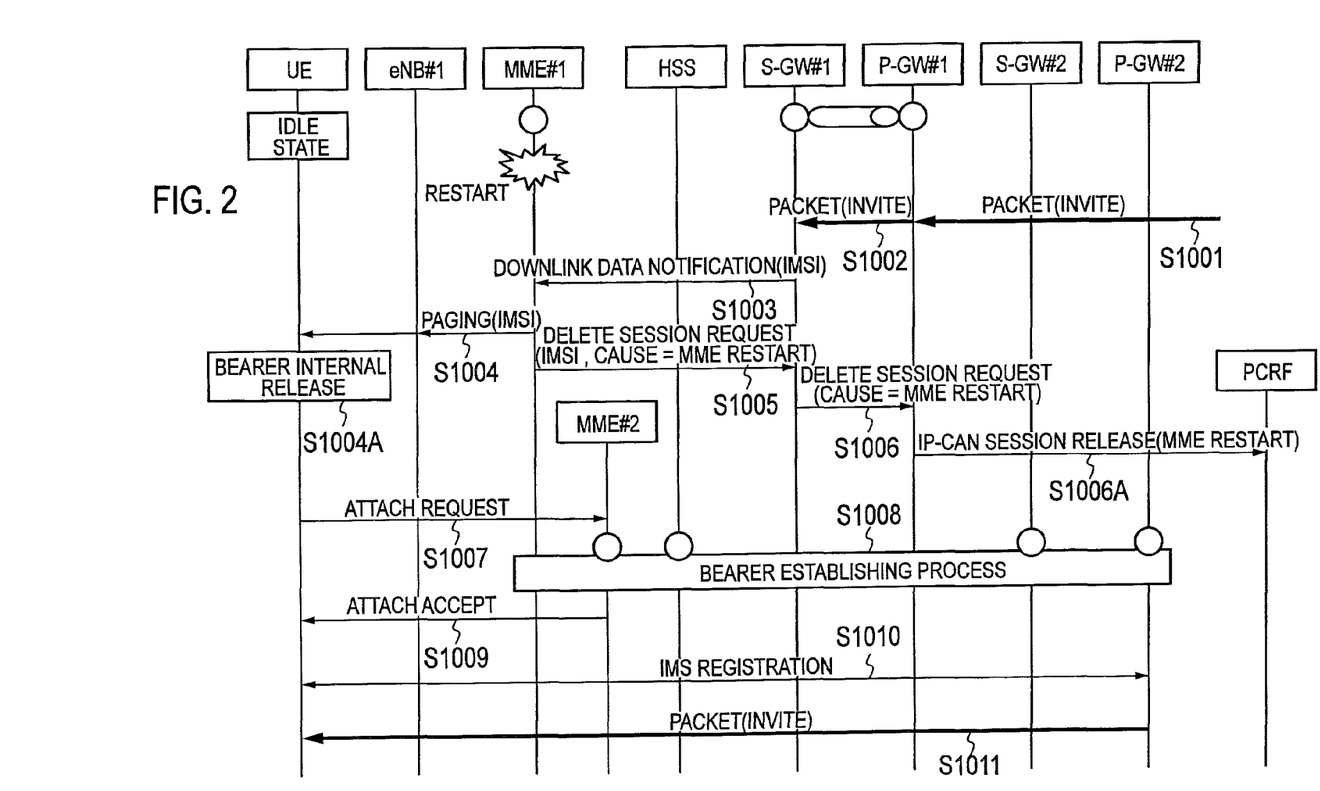
FIG. 2 is a sequence diagram describing operations of a mobile communication system according to the first embodiment of the present invention.

As shown in FIG. 2, if there is an incoming call addressed to the UE in Idle state in which registration with the IMS is complete after restart of the MME#1 which once stops due to a failure and the like while a bearer for the UE is established between the S-GW#1 and the P-GW#1, the P-GW#1 receives a packet addressed to the UE in Step S1001 and transmits such a packet to the S-GW#1 in Step S1002. It is assumed that such a packet contains "INVITE" addressed to the UE.

In Step S1003, the S-GW#1 transmits "Downlink Data Notification" containing IMSI of the UE to the MME#1.

Note that when receiving the packet in Step 1002, the S-GW#1 does not release context information on the bearer for the UE which it has retained, even if the S-GW#1 has learned that the MME#1 restarted, from a GTP signal (restart information) and the like which it received before Step S1002.

In addition, when the MME#1 restarts, if the S-GW#1 determines that it does not need to perform Paging using the IMSI of the UE, for example, when no signaling bearer for the IMS exists, the S-GW#1 may not contain the IMSI of the IE in the "Downlink Data Notification".

In such a case, upon receipt of such "Downlink Data Notification", the MME#1 performs a usual operation. If the MME#1 detects that corresponding context information is not managed, the MME#1 transmits "Downlink Data Notification Ack (error response)" to the S-GW#1.

When receiving such "Downlink Data Notification", the MME#1 judges whether or not the context information identified by such IMSI is managed.

Here, if the context information of the UE identified by such IMSI is managed, the MME#1 continues a usual Paging process.

On the other hand, if the MME#1 judges that the context information of the UE identified by such IMSI is not managed, the MME#1 not only transmits the "Paging" to the UE in Step S1004, but also transmits to the S-GW#1 "Delete Session Request" containing the IMSI of the UE and "Cause=MME restart (information indicating that the MME#1 has restarted)" instep S1005.

Note that in Step S1005, the MME#1 may transmit "Downlink Data Notification Ack (IMSI)" before transmitting "Delete Session Request".

In such a case, the S-GW#1 can learn whether or not the Paging process is complete correctly. If the Paging process fails, the S-GW#1 can perform a process such as a bearer release process and the like.

In Step 51006, upon receipt of such "Delete Session Request", the S-GW#1 not only releases the above-mentioned bearer for the UE identified by such IMSI but also transmits the "Delete Session Request" containing the "Cause=MME restart" to the P-GW#1.

In Step S1006A, upon receipt of such "Delete Session Request", the P-GW#1 not only releases the above-mentioned bearer for the UE but also transmits "IP-CAN Session Release" containing the "MME restart (the information indicating that the MME#1 has restarted)" to the PCRF.

Here, the PCRF which receives the "IP-CAN Session Release" releases the above-mentioned bearer for the UE.

Note that if PMIPv6 (Proxy Mobile IP v6) protocol is applied in a section between the S-GW#1 and the P-GW#1, in Step S1006, the S-GW#1 transmits "Proxy Binding Update" instead of "Create Session Request".

In such a case, the S-GW#1 sets the above-mentioned "Cause=MME restart (MME restart flag)" in the "Proxy Binding Update".

Alternatively, rather than setting the above-mentioned "Cause=MME restart (the MME restart flag)" in the "Proxy Binding Update", in Step S1005, the S-GW#1 may notify the PCRF of the above-mentioned "Cause=MME restart (the MME restart flag)" through signal processing (Gateway Control Session Establishment and the like) to be performed with the PCRF.

In such a case, the PCRF may notify the P-GW#1 of the above-mentioned "Cause =MME restart (the MME restart flag)" through signal processing (Policy and Charging Rules Provision and the like) to be performed on the P-GW#1. In such a case, Step S1006A is omitted.

On the other hand, upon receipt of the "Paging" addressed to the UE, the UE not only releases the above-mentioned bearer for the UE in Step S1004A, but also transmits the "Attach Request" to the MME#2 in Step S1007.

In Step S1008, in response to such "Attach Request", a process for establishing a bearer for the UE is performed among the MME#2, HSS, S-GW#2, and P-GW#2.

In Step S1009, the MME#2 transmits "Attach Accept" to the UE.

In Step S1010, "IMS Registration process" of the UE is performed.

Then, in Step S1011, upon receipt of a packet addressed to the UE, the P-GW#2 transmits such a packet to the UE by way of the S-GW#2.

With the mobile communication system according to the embodiment, since the MME#1 is configured to release the bearer for the UE between the S-GW#1 and the P-GW#1 if the MME#1 judges that the context information of the UE identified by the IMSI contained in the "Downlink Data Notification" received from the S-GW#1 is managed, a termination process addressed to such a UE can be performed without wasting a resource, when there is an incoming call addressed to the UE in Idle state in which registration with the IMS is complete, after restart of the MME which once stops due to a failure and the like.

Mobile Communication System According to a Second Embodiment of the Present Invention In the following, with reference to FIG. 3, a mobile communication system according to a second embodiment of the present invention will be described with a focus on differences from the mobile communication system according to the first embodiment described above.

Here, operations when there is an incoming call addressed to a UE in Idle state in which registration with an IMS is complete after restart of an MME#1 which once stops due to a failure and the like in the mobile communication system according to the embodiment will be described with reference to FIG. 3.

Figure 3:
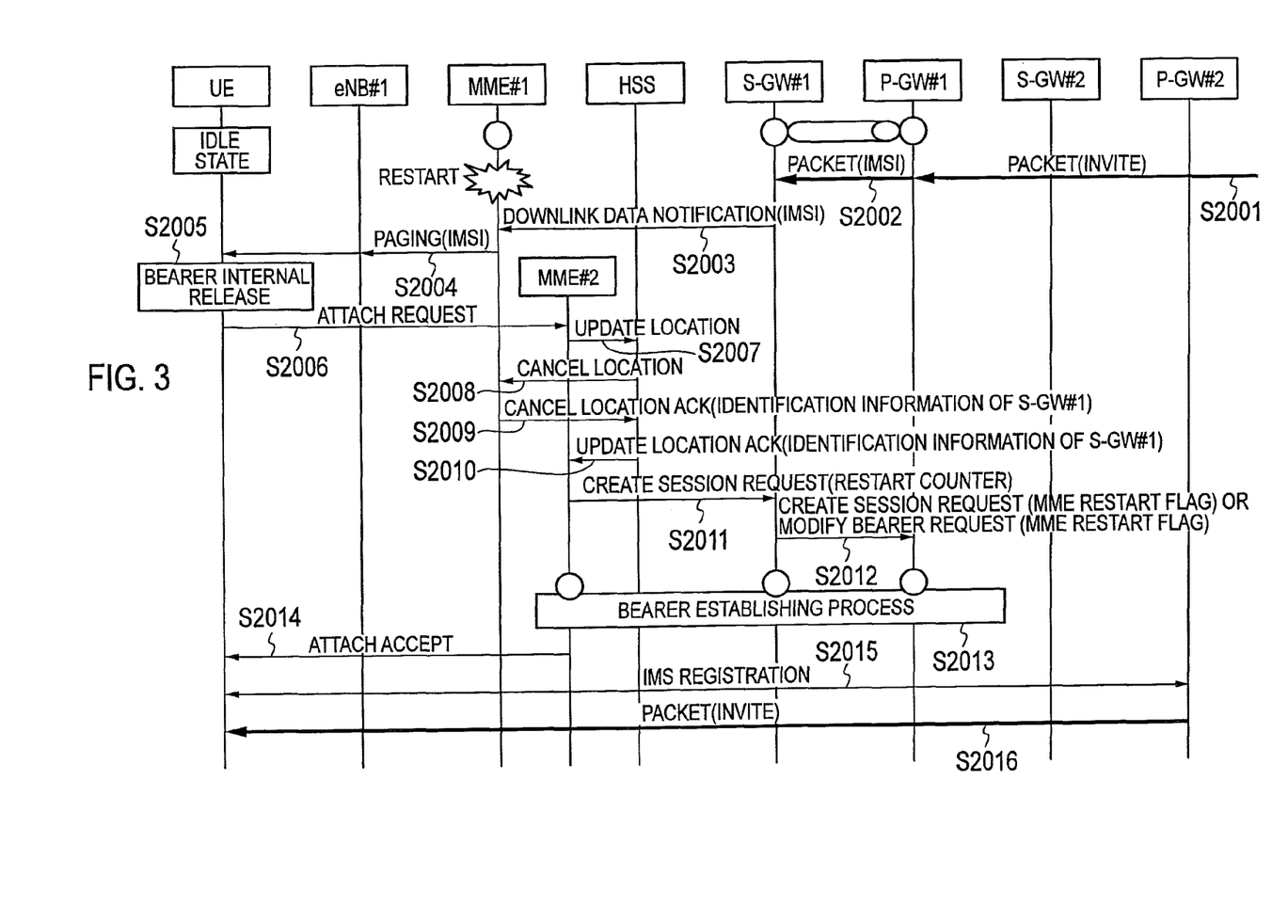
FIG. 3 is a sequence diagram describing operations of a mobile communication system according to a second embodiment of the present invention.

As shown in FIG. 3, when there is an incoming call addressed to the UE in the Idle state in which the registration with the IMS is complete after restart of the MME#1 which once stops due to a failure and the like while a bearer for the UE is established between an S-GW#1 and a P-GW#1, the P-GW#1 receives a packet addressed to the UE in Step S2001 and transmits such a packet to the S-GW#1 in Step S2002. It is assumed that such a packet contains "INVITE" addressed to the UE.

In Step S2003, the S-GW#1 transmits "Downlink Data Notification" containing IMSI of the UE to the MME#1.

When receiving such "Downlink Data Notification", the MME#1 judges whether or not the context information of a UE identified by such IMSI is managed.

Here, if the MME#1 judges that the context information of the UE identified by such IMSI is not managed, the MME#1 transmits "Paging" to the UE in Step S2004.

Upon receipt of the "Paging" addressed to the UE, the UE not only releases the above-mentioned bearer for the UE in Step S2005 but also transmits "Attach Request" to an MME#2 in Step S2006.

In Step S2007, the MME#1 transmits "Update Location" containing identification information of the UE to an HSS.

Upon receipt of such "Update Location", the HSS transmits "Cancel Location" to the MME#1 in Step S2008.

Upon receipt of such "Cancel Location", the MME#1 transmits "Cancel Location Ack" containing identification information of the S-GW#1 to the HSS in Step 52009.

Upon receipt of the "Cancel Location Ack", the HSS changes location registration information for the UE and transmits "Update Location Ack" containing the identification information of the S-GW#1 to the MME#2 in Step 52010.

In Step S2011, the MME#2 transmits "Create Session Request" containing a restart counter (information indicating that the MME#1 has restarted) to the S-GW#1. Note that the restart counter may not be set.

Upon receipt of such "Create Session Request", the S-GW#1 detects that it is a response from the UE for which the S-GW#1 has transmitted the "Downlink Data Notification" in Step S2003. The S-GW#1 not only releases the above-mentioned bearer for the UE, but also transmits "Create Session Request" containing an MME restart flag (information indicating that the MME#1 has restarted) to the P-GW#1.

Upon receipt of such "Create Session Request", the P-GW#1 releases the above-mentioned bearer for the UE and newly allocates a resource to be used in such a bearer for the UE.

In addition, if PMIPv6 (Proxy Mobile IP v6) protocol is applied in a section between the S-GW#1 and the P-GW#1, the S-GW#1 transmits "Proxy Binding Update" instead of "Create Session Request" in Step S2012.

In such a case, the S-GW#1 sets the above-mentioned "Cause=MME restart (the MME restart flag)" in the "Proxy Binding Update".

Alternatively, rather than setting the above-mentioned "Cause=MME restart (the MME restart flag)" in the "Proxy Binding Update", in Step S2011, the S-GW#1 may notify the PCRF of the above-mentioned "Cause=MME restart (the MME restart flag)" through signal processing (Gateway Control Session Establishment and the like) to be performed with the PCRF.

In such a case, the PCRF may notify the P-GW#1 of the above-mentioned "Cause=MME restart (the MME restart flag)" through signal processing (Policy and Charging Rules Provision and the like) to be performed on the P-GW#1.

In Step S2013, a process for establishing a bearer for the UE is performed among the MME#2, HSS, S-GW#1, and P-GW#1.

In Step S2014, the MME#2 transmits "Attach Accept" to the UE.

In Step S2015, "IMS Registration process" of the UE is performed.

Then, in Step S2016, upon receipt of a packet addressed to the UE, the P-GW#1 transmits such a packet to the UE by way of the S-GW#1.

Note that when receiving "Create Session Request" in Step S2011, the S-GW#1 may transmit "Modify Bearer Request" containing the MME restart flag (information showing that the MME#1 has restarted) to the P-GW#1 in Step S2012, without releasing the above-mentioned bearer for the UE.

In such a case, upon receipt of such "Modify Bearer Request", the P-GW#1 reuses such a bearer for the UE again without releasing the above-mentioned bearer for the UE.

With the mobile communication system according to the embodiment, since the MME#2 is configured to release the bearer for the UE established between the S-GW#1 and the P-GW#1, triggered by transmitting the "Create Session Request" containing the restart counter to the S-GW#1, a termination process to such a UE can be performed without wasting a resource when there is an incoming call addressed to the UE in Idle state in which registration with the IMS is complete after restart of the MME which once stops due to a failure and the like.

Mobile Communication System According to a
Third Embodiment of the Present Invention In the following, with reference to FIG. 4, a mobile communication system according to a third embodiment of the present invention will be described with a focus on differences from the mobile communication system according to the first embodiment described above.

Here, operations when there is an incoming call addressed to a UE in Idle state in which registration with an IMS is complete after restart of an MME#1 which once stops due to a failure and the like in the mobile communication system according to the embodiment will be described with reference to FIG. 4.

Figure 4:
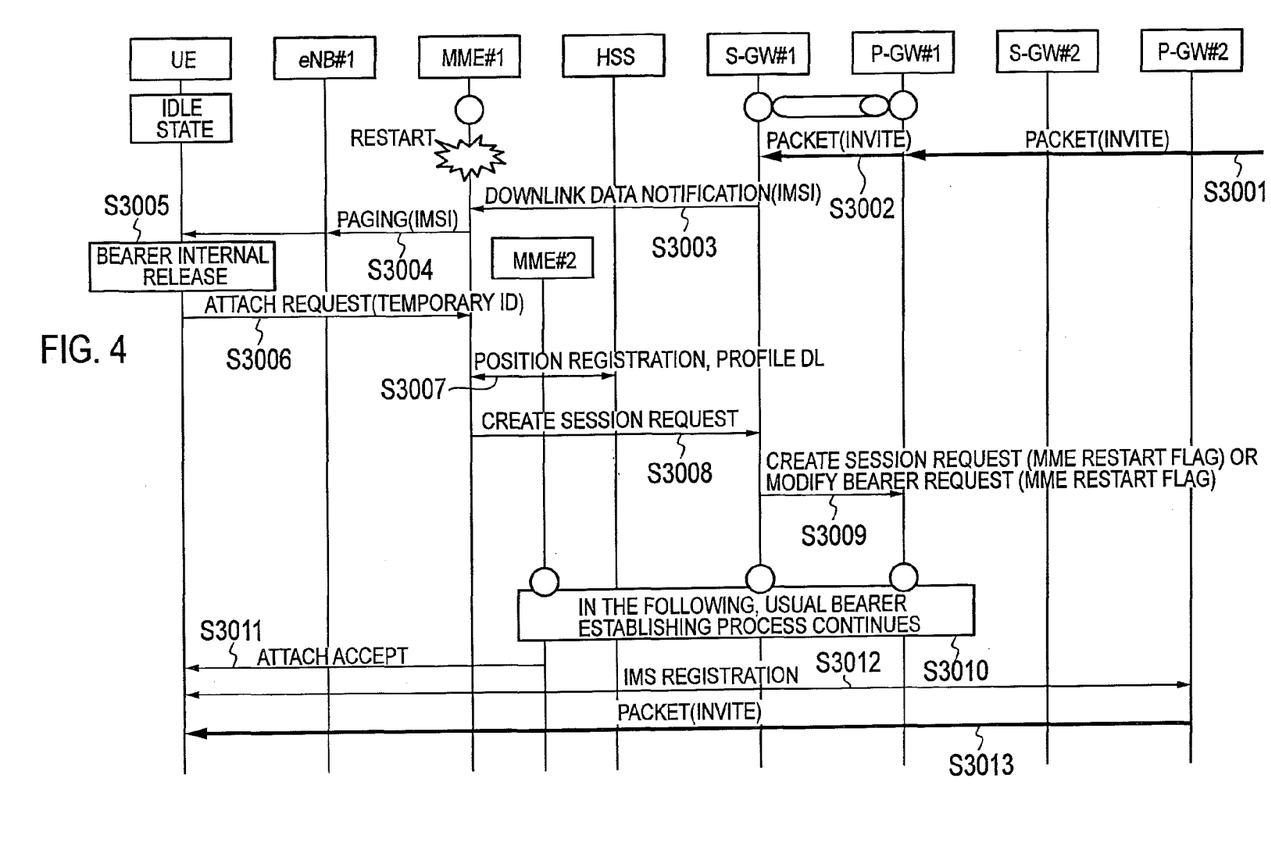
FIG. 4 is a sequence diagram describing operations of a mobile communication system according to a third embodiment of the present invention.

As shown in FIG. 4, when there is an incoming call addressed to the UE in the Idle state in which the registration with the IMS is complete after restart of the MME#1 which once stops due to a failure and the like while a bearer for the UE is established between an S-GW#1 and a P-GW#1, the P-GW#1 receives a packet addressed to the UE in Step S3001 and transmits such a packet to the S-GW#1 in Step S3002. It is assumed that such a packet contains "INVITE" addressed to the UE.

In Step S3003, the S-GW#1 transmits "Downlink Data Notification" containing IMSI of the UE to the MME#1.

When receiving such "Downlink Data Notification", the MME#1 judges whether or not the context information of the UE identified by such IMSI is managed.

Here, if the MME#1 judges that the context information of the UE identified by such IMSI is not managed, the MME#1 transmits "Paging" to the UE in Step S3004.

Upon receipt of the "Paging" addressed to the UE, the UE not only releases the above-mentioned bearer for the UE in Step S3005 but also transmits "Attach Request" containing a temporary ID of the UE to the MME#1 in Step S3006.

A temporary ID of the UE is a GUTI (Globally Unique Temporary Identifier), for example. An eNB#1 identifies the MME#1 as a transmission destination of such "Attach Request" by utilizing the temporary ID.

In Step S3007, upon receipt of such "Attach Request", the MME#1 not only performs a location registration process of the UE on the HSS but also downloads profile information on the UE from the HSS.

In step S3008, the MME#1 transmits "Create Session Request" containing a restart counter to the S-GW#1. Note that the restart counter may not be set.

Upon receipt of such "Create Session Request", the S-GW#1 detects that it is a response from the UE for which the S-GW#1 has transmitted the "Downlink Data Notification" in Step S3003. The S-GW#1 not only releases the above-mentioned bearer for the UE, but also transmits "Create Session Request" containing the MME restart flag to the P-GW#1.

Upon receipt of such "Create Session Request", the P-GW#1 releases the above-mentioned bearer for the UE and newly allocates a resource to be used in such a bearer for the UE.

Note that, if PMIPv6 (Proxy Mobile IP v6) protocol is applied in a section between the s-GW#1 and the P-GW#1, the S-GW#1 transmits "Proxy Binding Update" instead of "Create Session Request" in Step S3009.

In such a case, the S-GW#1 sets the above-mentioned "Cause=MME restart (the MME restart flag)" in the "Proxy Binding Update".

Alternatively, rather than setting the above-mentioned "Cause=MME restart (the MME restart flag)" in the "Proxy Binding Update", in Step S3008, the S-GW#1 may notify a PCRF of the above-mentioned "Cause=MME restart (the MME restart flag)" through signal processing (Gateway Control Session Establishment and the like) to be performed with the PCRF.

In such a case, the PCRF may notify the P-GW#1 of the above-mentioned "Cause=MME restart (the MME restart flag)" through signal processing (Policy and Charging Rules Provision and the like) to be performed on the P-GW#1.

In Step S3010, a process for establishing a bearer for the UE is performed among the MME#2, HSS, S-GW#1, and P-GW#1.

In Step S3011, the MME#2 transmits "Attach Accept" to the UE.

In Step S3012, "IMS Registration process" of the UE is performed.

Then, in Step S3013, upon receipt of a packet addressed to the UE, the P-GW#1 transmits such a packet to the UE by way of the S-GW#1.

Note that when receiving "Create Session Request" in Step S3008, the S-GW#1 may transmit "Modify Bearer Request" containing the MME restart flag to the P-GW#1 in Step 53009, without releasing the above-mentioned bearer for the UE.

In such a case, upon receipt of such "Modify Bearer Request", the P-GW#1 reuses such a bearer for the UE again without releasing the above-mentioned bearer for the UE.

With the mobile communication system according to the embodiment, since the MME#1 is configured to release the bearer for the UE established between the S-GW#1 and the P-GW#1, triggered by transmitting the "Create Session Request" containing the restart counter to the S-GW#1, a termination process to such a UE can be performed without wasting a resource when there is an incoming call addressed to the UE in Idle state in which registration with the IMS is complete after restart of the MME which once stops due to a failure and the like.

The characteristics of the embodiment described above may be represented as follows.

A first characteristic of the embodiment is a mobile communication method, and is summarized in that the method includes the steps of: causing an MME#1 (first mobility management node) to restart while a bearer for a UE (mobile station) is established between an S-GW#1 (first serving gateway device) and a P-GW#1 (first packet data network gateway device) ; causing the MME#1 not only to transmit "Paging (paging signal)" to the UE but also to transmit to the S-GW#1 "Delete Session Request (a session delete request signal)" containing IMSI (identification information) of the UE and information indicating that the MME#1 has restarted, when receiving "Downlink Data Notification (a notification signal)" containing the IMSI of the UE from the S-GW#1; causing the S-GW#1 not only to release the bearer for the UE but also to transmit to the P-GW#1 the "Delete Session Request" containing information (Cause=MME restart) indicating that the MME#1 has restarted, upon receipt of the "Delete Session Request"; causing the P-GW#1 to release the bearer for the UE, upon receipt of the "Delete Session Request"; causing the UE to transmit "Attach Request (an attach request signal)" to an MME#2 (a second mobility management node), upon receipt of the "Paging"; and in response to the "Attach Request", establishing a bearer for the UE between an S-GW#2 (a second serving gateway device) and a P-GW#2 (a second packet data network gateway device).

A second characteristic of the embodiment is a mobile communication method, and is summarized in that the method includes the steps of: causing an MME#1 to restart while a bearer for a UE is established between an S-GW#1 and a P-GW#1; causing the MME#1 to transmit "Paging" to the UE, when receiving "Downlink Data Notification" containing IMSI of the UE from the S-GW#1; causing the UE to transmit "Attach Request" to an MME#2, upon receipt of the "Paging"; causing the MME#2 to transmit "Create Session Request (a create session request signal)" to the S-GW#1, upon receipt of the "Attach Request"; causing the S-GW#1 not only to release the bearer for the UE but also to transmit the "Create Session Request" to the P-GW#1, upon receipt of the "Create Session Request"; causing the P-GW#1 to release the bearer for the UE, upon receipt of the "Create Session Request"; and resetting the bearer for the UE between the S-GW#1 and the P-GW#1.

A third characteristic of the embodiment is a mobile communication method, and is summarized in that the method includes the steps of : causing an MME#1 to restart while a bearer for a UE is established between an S-GW#1 and a P-GW#1; causing the MME#1 to transmit "Paging" to the UE, when receiving "Downlink Data Notification" containing IMSI of the UE from the S-GW#1; causing the UE to transmit "Attach Request" to an MME#2, upon receipt of the "Paging"; causing the MME#2 to transmit "Create Session Request" to the S-GW#1, upon receipt of the "Attach Request"; causing the S-GW#1 to transmit "Modify Bearer Request (a modify bearer request signal) " to the P-GW#1, without releasing the bearer for the UE, upon receipt of the "Create Session Request"; and resetting the bearer for the UE between the S-GW#1 and the P-GW#1.

A fourth characteristic of the embodiment is a mobile communication method, and is summarized in that the method includes the steps of : causing an MME#1 to restart while a bearer for a UE is established between an S-GW#1 and a P-GW#1; causing the MME#1 to transmit "Paging" to the UE, when receiving "Downlink Data Notification" containing IMSI of the UE from the S-GW#1; causing the UE to transmit "Attach Request" to the MME#1, upon receipt of the "Paging"; causing the MME#1 to transmit "Create Session Request" to the P-GW#1, upon receipt of the "Attach Request"; causing the S-GW#1 not only to release the bearer for the UE but also to transmit the "Create Session Request" to the P-GW#1, upon receipt of the "Create Session Request" ; causing the P-GW#1 to release the bearer for the UE, upon receipt of the "Create Session Request"; and resetting the bearer for the UE between the S-GW#1 and the P-GW#1.

A fifth characteristic of the present invention is mobile communication method, and is summarized in that the method includes the steps of : causing an MME#1 to restart while a bearer for a UE is established between an S-GW#1 and a P-GW#1; causing the MME#1 to transmit "Paging" to the UE, when receiving "Downlink Data Notification" containing IMSI of the UE from the S-GW#1; causing the UE to transmit "Attach Request" to the MME#1, upon receipt of the "Paging"; causing the MME#1 to transmit "Create Session Request" to the P-GW#1, upon receipt of the "Attach Request"; causing the S-GW#1 to transmit "Modify Bearer Request" to the P-GW#1, without releasing the bearer for the UE, upon receipt of the "Create Session Request"; and resetting the bearer for the UE between the S-GW#1 and the P-GW#1.

Note that, operations of the MME#1, MME#2, S-GW#1, S-GW#2, P-GW#1, P-GW#2, PCRF, P/S-CSCF, eNB#1, eNB#2, and UE described above, may be performed by hardware, may be performed by a software module executed by a processor, or may be performed by a combination of both.

The software module may be provided in any type of storage medium such as a RAM (Random Access Memory), flash memory, ROM (Read Only Memory), EPROM (Erasable Programmable ROM), EEPROM (Electronically Erasable and Programmable ROM), register, hard disk, removal disk, or CD-ROM.

Such a storage medium is connected to a processor so that the processor can read and write information from and to the storage medium. In addition, such a storage medium may be integrated in a processor. In addition, such a storage medium and processor may be provided in an ASIC. Such an ASIC may be provided in an MME#1, MME#2, S-GW#1, S-GW#2, P-GW#1, P-GW#2, PCRF, P/S-CSCF, eNB#1, eNB#2, or UE. In addition, such a storage medium and processor may be provided in an MME#1, MME#2, S-GW#1, S-GW#2, P-GW#1, P-GW#2, PCRF, P/S-CSCF, eNB#1, eNB#2, or UE as discrete component.

Although the present invention has been described so far in detail with the embodiments described above, it is apparent to those skilled in the art that the present invention is not limited to the embodiments described herein. The present invention can be carried out as a modification or alteration without departing from the intent and scope of the present invention to be defined by a description of the claims. Therefore, the description of the specification is intended to provide an exemplary description and does not have any limiting sense to the present invention.

The invention claimed is:

1. A mobile communication method comprising the steps of:
   causing a first mobility management node, which has stopped due to a malfunction including a failure, to restart while a bearer for a mobile station is established between a serving gateway device and a packet data network gateway device;
   causing the serving gateway device to transmit a notification signal containing identification information of the mobile station to the first mobility management node, without releasing the bearer for the mobile station, when receiving a packet addressed to the mobile station after restart of the first mobility management node;
   causing the first mobility management node to transmit a paging signal to the mobile station, when receiving the notification signal containing the identification information of the mobile station from the serving gateway device;
   causing the mobile station to transmit an attach request signal to a second mobility management node, which is different from the first mobility management node, upon receipt of the paging signal transmitted from the first mobility management node in response to reception of a packet addressed to the mobile station after restart of the first mobility management node;
   causing the second mobility management node to transmit a create session request signal to the serving gateway device, upon receipt of the attach request signal;
   causing the serving gateway device not only to release the bearer for the mobile station but also to transmit the create session request signal to the packet data network gateway device, upon receipt of the create session request signal; and
   establishing the bearer for the mobile station between the serving gateway device and the packet data network gateway device which receives the create session request signal.

2. A serving gateway device, wherein the serving gateway device is configured to transmit a notification signal containing identification information of a mobile station to a first mobility management node without releasing a bearer for the mobile station, when receiving a packet addressed to the mobile station after restart of the first mobility management node, which has stopped due to a malfunction including a failure, while the bearer for the mobile station is established between the serving gateway device and a packet data network gateway device,
   the serving gateway device is configured not only to release the bearer established for the mobile station but also to transmit a create session request signal to the packet data network gateway device, when receiving the create session request signal requesting creation of a bearer between the serving gateway device and the packet data network gateway device from a second mobility management node, which is different from the first mobility management node, and
   wherein the notification signal causes the mobile station to transmit an attach request signal to a second mobility management node upon receipt of a paging signal transmitted from the first mobility management node in response to reception of a packet addressed to the mobile station after restart of the first mobility management node.

* * * * *